United States Patent [19]
Vion

[11] Patent Number: 6,083,388
[45] Date of Patent: Jul. 4, 2000

[54] WATER TREATMENT PLANT AND SET OF MODULAR EQUIPMENT OBTAINED BY PLACING SUCH PLANTS IN PARALLEL

[75] Inventor: Patrick Vion, Houilles, France

[73] Assignee: Degremont, Rueil Malmaison, France

[21] Appl. No.: 09/202,595

[22] PCT Filed: Jun. 2, 1997

[86] PCT No.: PCT/FR97/00960

§ 371 Date: Dec. 17, 1998

§ 102(e) Date: Dec. 17, 1998

[87] PCT Pub. No.: WO97/48468

PCT Pub. Date: Dec. 24, 1997

[30] Foreign Application Priority Data

Jun. 17, 1996 [FR] France ................................ 96 07500

[51] Int. Cl.[7] .................................................. B01D 15/00
[52] U.S. Cl. ......................... 210/202; 210/253; 210/260
[58] Field of Search .................... 210/253, 259, 210/260, 261, 262, 266, 202

[56] References Cited

U.S. PATENT DOCUMENTS 3,353,679  11/1967  Hirsch ...................................... 210/253
5,252,214  10/1993  Lorenz et al. ........................... 210/622
5,256,299  10/1993  Wang et al. ............................. 210/259

FOREIGN PATENT DOCUMENTS 2103596  2/1983  United Kingdom.
92/01636  2/1992  WIPO.

*Primary Examiner*—Ivars Cintins
*Attorney, Agent, or Firm*—Pollock, Vande Sande & Amernick

[57] ABSTRACT

Water treatment plant having pretreatment means, such as in particular means of desanding, degreasing, physico-chemical pretreatment such as coagulation and flocculation and biological pretreatment, as well as means of separating the solid particles contained in the untreated water, characterized in that the solid/liquid separation means are contained within a construction of circular shape, and the untreated-water supply means as well as at least one of the pretreatment means are incorporated in a structure in the shape of an isosceles trapezoid whose projected apex lies on a diametral axis of the construction of circular shape containing the separation means, whose sides are formed by the two tangents to the circular construction leading from the said projected apex and whose base is tangent to the circular construction at the point of intersection of this construction with the diametral axis.

18 Claims, 4 Drawing Sheets

和6,083,388

WATER TREATMENT PLANT AND SET OF MODULAR EQUIPMENT OBTAINED BY PLACING SUCH PLANTS IN PARALLEL

CROSS REFERENCES TO RELATED APPLICATIONS

This application is a national phase application of International Application No. PCT/FR97/00960, with an international filing date of Jun. 2, 1997.

1. Field of the Invention

The present invention relates to a water treatment plant and a battery of modular water treatment equipment produced by connecting a plurality of such plants in parallel.

2. Background of the Invention

It is known that there are several phases in physico-chemical processes for treating water (in particular river water or subterranean water for the preparation of drinking water, industrial water, residual urban water, residual industrial water, etc.):

coagulation, which forms the phase of neutralizing the colloids by the addition of inorganic coagulants such as metal salts with a contact time of the order of 0.5 to 3 minutes;

flocculation, which is a phase of aggregating the particles contained in the untreated water and which is carried out in one or more steps by adding flocculants or polyelectrolytes, in general based on organic polymers, with a contact or maturing time of the order of 4 to 30 minutes, and separation of the solid particles in a separation means which can be produced in the form of a settling tank, optionally equipped with lamellar modules, whose role is to increase the sedimentation rate of the particles.

In modern plants, the separation means are generally lamellar settling tanks. The settling tank proper generally has a volume which is much greater than the volume needed for the coagulation/flocculation phases. These lamellar settling tanks may be rectangular, but they are most often of square shape. They integrate the lamellar modules and they comprise a circular system for scraping in a circle contained within the area of the square.

These settling tanks have a number of associated problems, which can be ranked in two main orders: unitary production and connection of several units in parallel.

UNITARY PRODUCTION

General Hydraulics Characteristics

The flocculation reactor, which is smaller than the settling tank, does not always supply (or cannot be designed to supply) the settling tank over its entire width. This results in heterogeneous hydraulic flows which are concentrated on the central part or on the sides of the settling tank, and these flow asymmetries compromise the settling by creating turbulence in a zone which should be calm.

Square Settling Tank with Contained Circular Scraping

This very widespread embodiment has the following drawbacks:

it is necessary to produce "packers", that is to say concrete accessories in the lower corners of the construction, with a slope greater than the flow angle of the sludge (that is to say an angle in excess of 50°), this being in order to prevent stagnant zones. Such "packers" are difficult to produce and sometimes have heights which are incompatible with the conventional geometry of the constructions: thus, 60° "packers" in a settling tank with a side length of 20 meters would need to rise to more than 7 meters in height;

the booms for cleaning (by spraying air or water) which are fixed on the drive tube of the circular scraper do not make it possible to clean the lamellar modules lying in the corners of the settling tank.

Circular Settling Tank with Contained Lamellar Modules

These types of settling tank do not have the drawbacks of the type described above, but are a priori more difficult to produce, especially in concrete, and it is impossible to benefit from common walls which may, where appropriate, allow several settling tanks to be arranged in parallel.

CONNECTING THE UNITS IN PARALLEL

Such parallel connection should solve the following problems:

Supply Rate several units in parallel requires channels or distribution tubes of great length (possibly up to 100 meters long, or even more).

FIG. 1 of the drawings schematically represents a conventional plant connecting a number of water treatment equipment units in parallel, each comprising a coagulator 1, a flocculator 2 and a settling tank 3. This figure shows, at 4, the "packers" produced as indicated above in the lower corners of the settling tank and, at 5, the channel for supplying the various equipment units which are arranged in parallel. This distributing channel 5 forms a critical element of the plant because it needs to fulfill two conflicting functions:

The transfer function needs to be done at high speed in order to prevent the sludge, sand etc. from settling; the problem may be further exacerbated when the desanding is not carried out upstream of the equipment, but directly in the coagulator/flocculator as described in FR-A-2,679,223.

The function of distribution: each device is generally supplied by means of a calibrated weir, but the head losses along the distributing channel 5 make it necessary, for each of the weirs, to calculate threshold levels which differ according to the position of this weir along the distribution channel. Furthermore, the threshold height calculated for one given flow rate no longer makes it possible to balance the flows in case of variations in the total flow rate. In order to ensure an acceptable distribution, it would then be necessary to limit the transfer speed in the channel (which can conflict with the low-deposit requirements described in the previous paragraph) or else to increase significantly the height of water over the weir, which results in increased energy expenditure.

BRIEF DESCRIPTION OF THE INVENTION

Connecting unitary constructions of parallelepipedal type in parallel most often generates zones which are lost through being unusable. FIG. 1 of the appended drawings shows, at 6, such a zone adjacent to the flocculator 2 and to the coagulator 1.

It is difficult, or even impossible, and always expensive to centralize the means of extracting the sludge, sand and grease and to distribute the stations for dispensing reagents, the measuring and monitoring instruments for each settling tank, etc.

In order to solve the problems thus mentioned above, in particular with a view to producing batteries of modular water treatment equipment which are particularly compact, the invention provides a water treatment plant, particularly for physico-chemical treatment, having pretreatment means, such as in particular means of desanding, degreasing, physico-chemical pretreatment such as coagulation and flocculation and biological pretreatment, as well as means of separating the solid particles contained in the untreated water, characterized in that the solid/liquid separation means are contained within a construction of circular shape, and the untreated-water supply means as well as at least one of the pretreatment means are incorporated in a structure in the shape of an isosceles trapezoid whose projected apex lies on a diametral axis of the construction of circular shape containing the separation means, whose sides are formed by the two tangents to the circular construction leading from the projected apex and whose base is tangent to the circular construction at the point of intersection of this construction with the said diametral axis.

The invention thus makes it possible to contain the complement of separation (in particular settling tank)-pretreatment means in a geometrical figure which substantially has the shape of a drop of water or of a petal of a flower, more particularly of a daisy.

According to a first embodiment of the invention, the coagulation and flocculation means are incorporated in the structure in the shape of an isosceles trapezoid.

According to a second embodiment of this invention, the desanding and degreasing means are incorporated in the structure in the shape of an isosceles trapezoid.

According to yet another embodiment of the invention, the structure in the shape of an isosceles trapezoid accommodates the biological water-treatment means.

Naturally, and as mentioned above, the structure in the shape of an isosceles trapezoid may accommodate all or some of the various pretreatment, in particular physico-chemical and biological, means.

According to the invention, the separation means may be formed by settling tanks, in particular of lamellar type, but these settling tanks may be replaced by separators of the hydrocyclone type, or else alternatively by flotation or filtration systems.

It will be noted that, depending on the pretreatment, in particular physico-chemical or biological, functions to be performed in this plant which are incorporated in the isosceles triangle (desanding, degreasing, coagulation, flocculation, double neutralization, etc.), the area of this triangle will, according to the invention, be defined in proportion to the necessary contact times, according to the knowledge of the person skilled in the art, and the height of the trapezoid and therefore the value of its projected apex angle will thus be determined, this dimensioning method being valid for a given diameter of the separation system, in particular of the settling tank. It will be assumed as a first approximation that the diameter of the settling tank proper is substantially constant for a given water flow rate.

As indicated above, the invention makes it possible to produce batteries of modular water treatment equipment which are obtained by connecting a plurality of modules in parallel, each consisting of a plant, of the type defined above, the configuration of the said battery having the appearance of a flower of which each petal is formed by one module, the supply common to each module lying in a central position in the center of the flower.

According to the present invention, the various modules forming a battery are joined by arranging in common the wall or walls of the structure of each module in the shape of an isosceles trapezoid which are tangent to the circular structure of the module containing the separation means, the maximum number of modules which can be connected in parallel being 360/Δ, Δ being the projected apex angle of the isosceles trapezoid, the configuration of the battery thus formed being that of a daisy.

Other characteristics and advantages of the present invention will emerge from the description given below with reference to the appended drawings, which show an entirely non-limiting illustrative embodiment thereof.

DETAILED DESCRIPTION OF THE INVENTION

Figure 2:
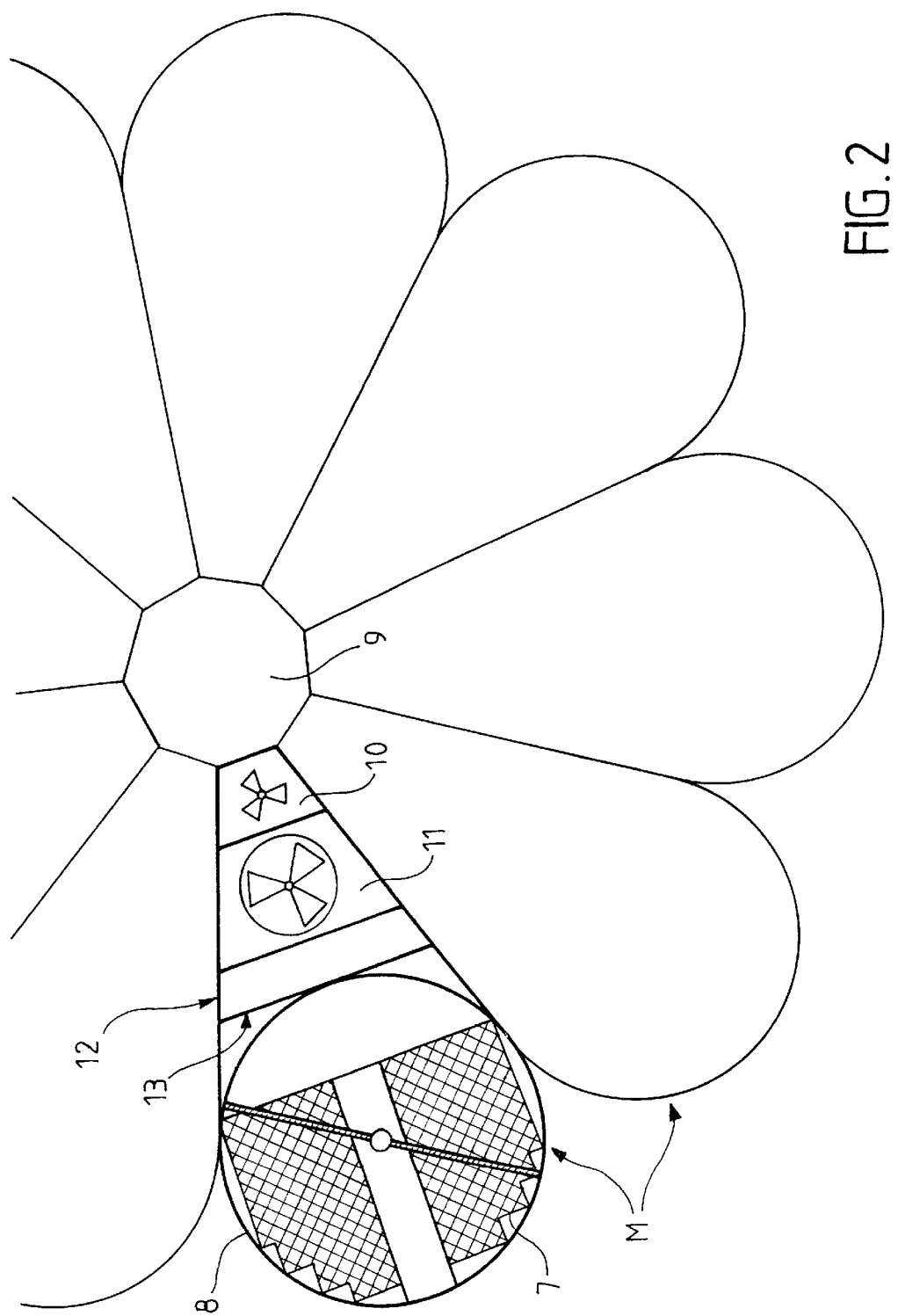
FIG. 2 is a schematic plan view of an embodiment of a plant according to the present invention.

Referring to FIG. 2, it is seen that in each module M of the plant according to the invention, the separation means which, in this illustrative embodiment are produced in the form of a lamellar settling tank 7, are contained within a circular construction 8 and that the supply 9, coagulation 10 and flocculation 11 structures are contained within an isosceles trapezoid denoted by the reference 12, the projected apex of which lies on a diametral axis of the circle of the construction 8. As can be seen in FIG. 2, the sides of this isosceles trapezoid 12 are formed by the two tangents to the circle 8 leading from the projected apex, and the base 13 of this isosceles trapezoid is tangent to the circle of the construction 8, at the point of intersection of this circle with the diametral axis.

FIG. 2 schematically represents the other modules M forming the plant according to the invention, each module having the shape of a drop of water or of a petal of a flower, in particular of a daisy. According to the invention, and as will be described below, the desired number of modules of type M may be arranged in parallel.

It will be noted that this type of multicellular equipment makes it possible to implement specific supply and distribution systems which are particularly advantageous when two or more settling tanks are arranged in parallel. These supply and distribution systems may be produced in the form of a cylindrical tank 14 (FIG. 3) which is supplied axially or tangentially (supply channel 15) and is equipped with means 16 for hydraulic distribution to each module M.

Figure 3:
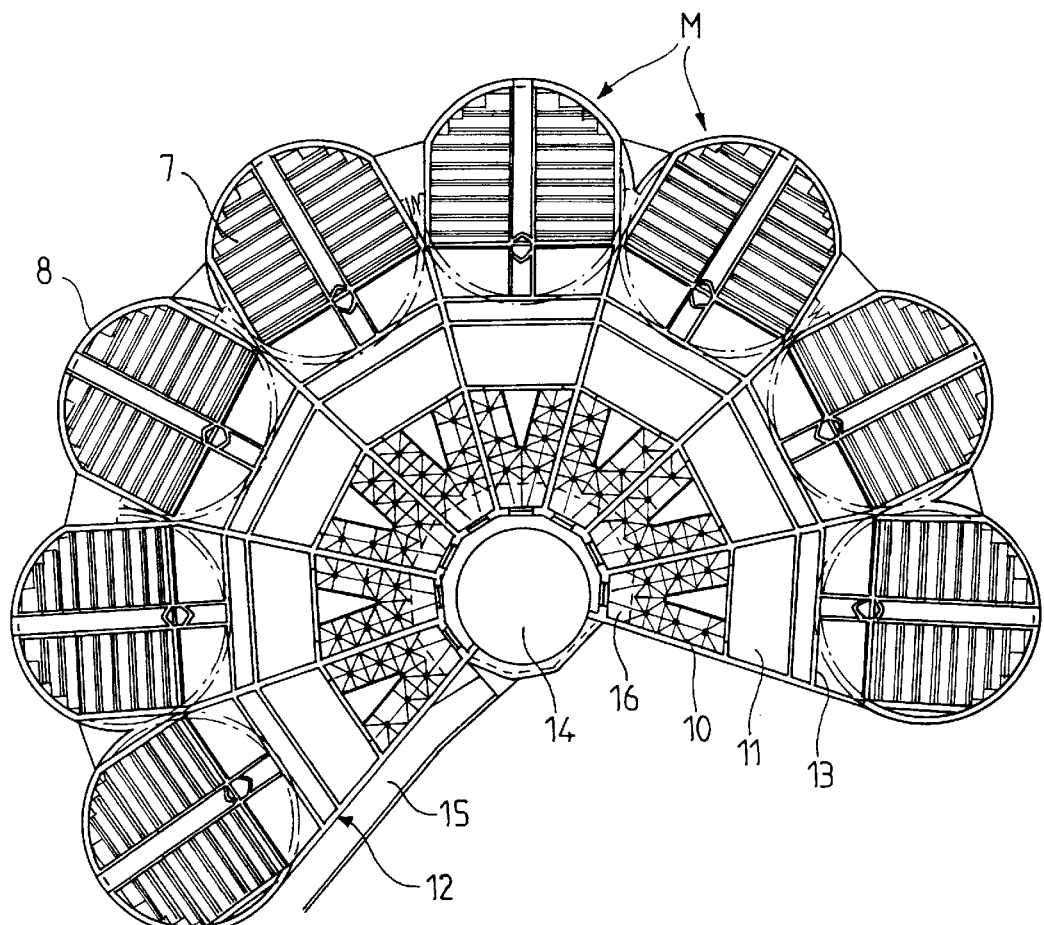
FIG. 3 represents a more detailed view of a plant according to the one represented schematically in FIG. 2.
Figure 4:
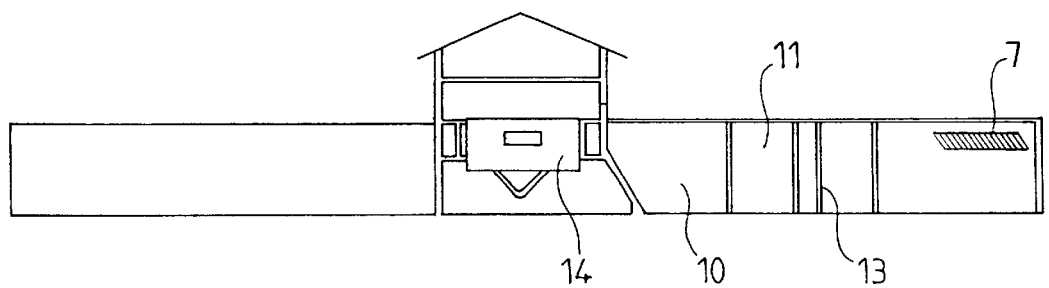
FIG. 4 is a view in section through a vertical diametral plane of FIG. 3.

It will be understood from reading the above description, and from examining FIGS. 2 and 3, that the geometry according to the invention of each of the modules, or water treatment units M greatly facilitates their connection in parallel:

It is possible according to the invention to join the modules or units M by arranging in common the wall (or walls) tangent to each circular settling tank such as 7 (this arrangement is the one illustrated by FIGS. 2 and 3). If the projected apex angle is equal to Δ°, the maximum number of modules or treatment units M which can be installed in parallel will be 360/Δ. The configuration resulting from this arrangement resembles a daisy, as already indicated above.

Figure 1:
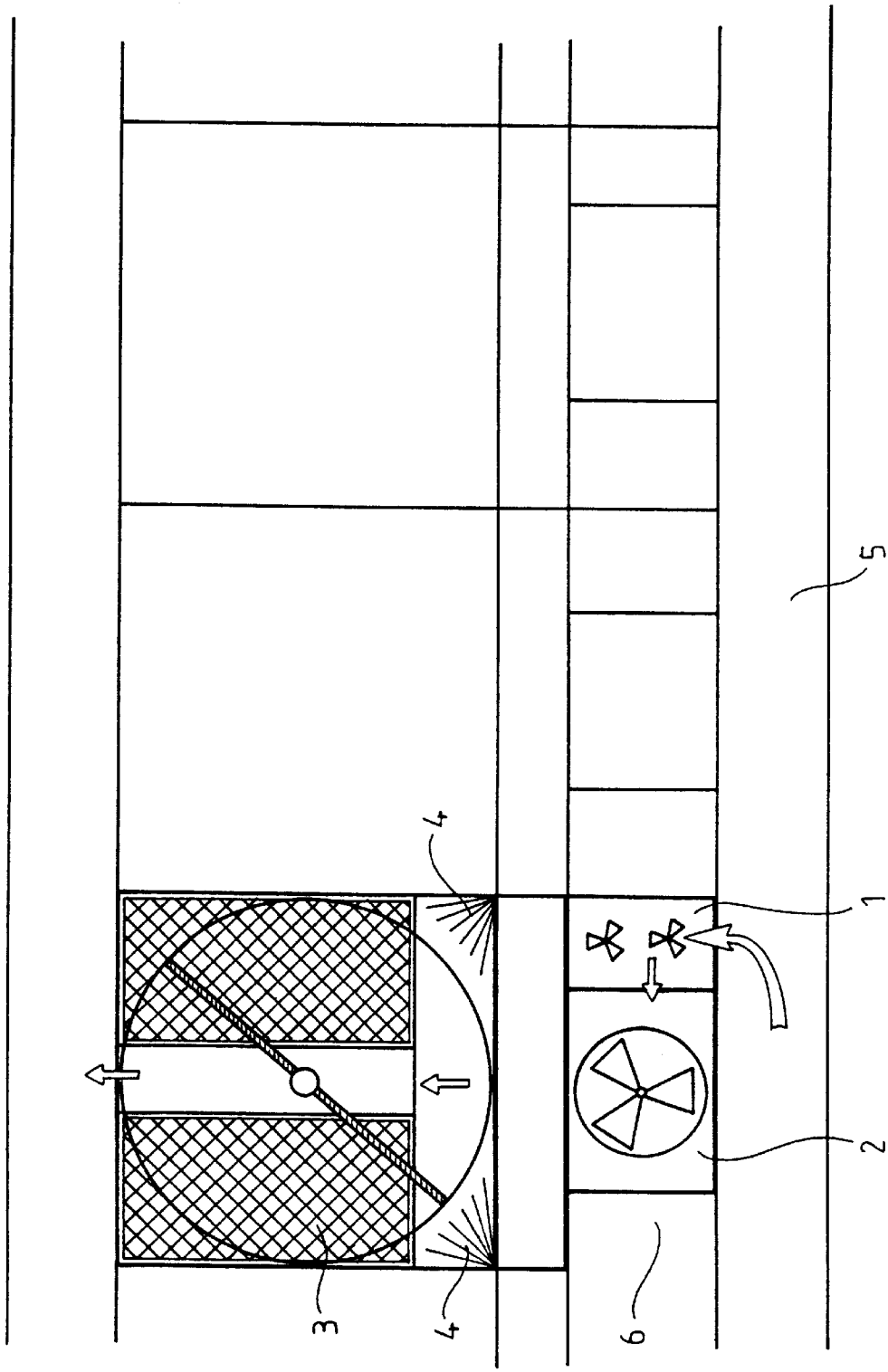
FIG. 1 is a schematic plan view illustrating the prior art discussed above relating to the arrangement of conventional modular water treatment equipment units in parallel.

The supply 9 (FIG. 2) or 14 (FIG. 3) common to all the settling tanks 7 lies in a central position, that is to say at the "heart of the daisy", which affords the major advantage of obviating the long distribution channel 5 of the plants according to the prior art discussed above with reference to FIG. 1.

Because of the absence of in-line head loss which results from the omission of such a longitudinal distribution channel, all the distribution means are set to the same horizontal plane and they make it possible to ensure a constant head of water at the inlet of each settling tank; the heterogeneities in distribution which are observed during the variations in flow rate, in the case of supply by a longitudinal channel, are thereby also overcome.

The risks of deposits which were mentioned above with reference to the "function of transfer" are virtually eliminated and, in any case, are easy to control in view of the compact nature of the distribution construction and its circular shape (the possibility of tapping, or even scraping).

The central supply zone 9 (FIG. 2) or 14 (FIG. 3) (heart of the daisy) makes it possible to stack several equipment units common to the units or modules M thus assembled in parallel, among others:

the distribution system the complement of sludge or sand pumps (located at the lower level);

the reagent metering stations;

the systems for monitoring, controlling and managing the constructions.

Implementation and utilization of the peripherals are thus greatly simplified because all these functions are grouped together in a central position.

According to the present invention, and as already indicated above, the settling tanks may have a square, rectangular or circular shape, what is essential being that they can still be contained within a circle and/or that they are joined at the base of the isosceles trapezoid 12 described above. These settling tanks may be of arbitrary type, with or without lamellar modules. They may be replaced by separators of the hydrocyclone type, or alternatively by flotation systems or filtration means.

Figure 5:
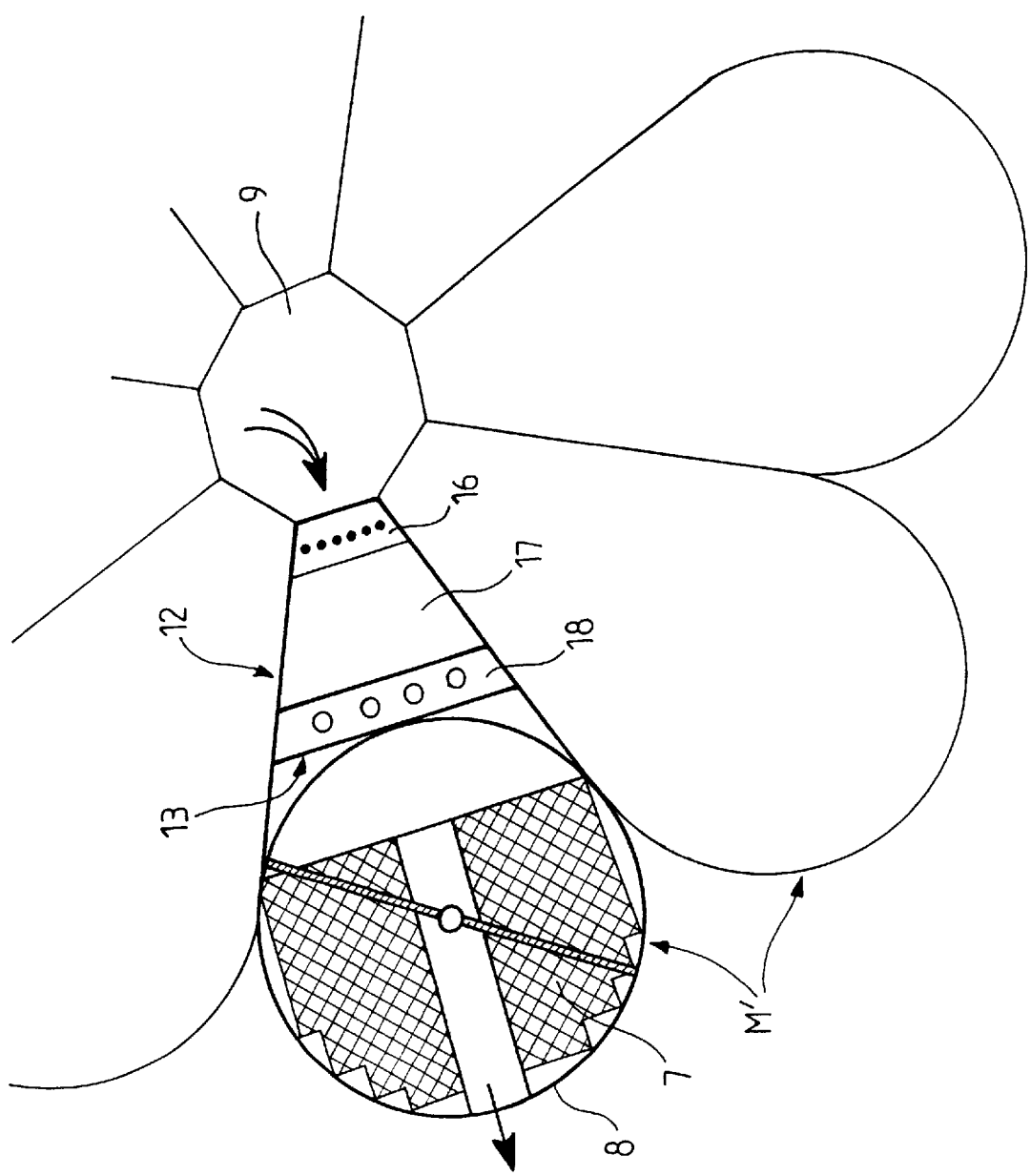
FIG. 5 is a schematic plan view similar to FIG. 2, showing a variant of the plant according to the present invention.

The invention may, of course, be applied to a plant which, in the same equipment (cf. FR-A-2,679,223) employs processes which carry out the desanding, the degreasing and the physico-chemical treatments with lamellar settling of the urban and/or industrial waste water, and the invention is also applicable to devices which carry out the desanding, degreasing and lamellar settling (without addition reagents) of urban and/or industrial waste water. This variant of the invention is illustrated by FIG. 5. In this variant, the separation means which, in this example which of course implies no limitation, are produced by a lamellar settling tank 7 are contained within the structure 8 of circular shape of each module M', in the same way as described above, and the supply means 16 to which the central distribution means 9 deliver, as well as the desanding means 17 and the degreasing means 18, are incorporated in the structure 12 in the shape of an isosceles trapezoid which was described above.

The system as described above for connecting units or modules for water treatment M, M' in parallel may advantageously be applied:

to all types of lamellar or conventional settling tanks implementing one or more physico-chemical or biological processes, whether or not including sludge recycling, injection of weighting material (cf. FR-A-2, 720,736, FR-A-2,719,235) and covering all the processes for treating water such as clarification, decarbonation by precipitation, neutralization, selective precipitation, etc.;

to various other physico-chemical or even biological processes, whether or not involving solid/liquid separation by any suitable process, such as in particular settling, flotation, filtration, cycloning, etc., this list not being exhaustive;

to all physico-chemical or biological processes employing one or more reactors which can be contained within a trapezoid as described above and may or may not include solid/liquid separation means positioned downstream of the means implementing the said physico-chemical or biological processes.

Among the advantages which are provided by the present invention and result, in particular, from the unitary appearance of the plants which it makes it possible to produce by virtue of the modules, particular mention should be made of:

the circular shape of the construction accommodating the solid/liquid separation means (in particular the settling tank described above), which makes it possible:

to omit two of the four corner "packers" in comparison with conventional settling tanks with square or rectangular cross section;

a very significant reduction in the volume of the remaining two "packers";

the implementation of a device for cleaning the lamellar modules with an air or water injection boom integral, both as regards fastening it and supplying it, with the drive tube of the scraper;

the substantially trapezoidal geometry of the structure 12 in which the preprocessing, in particular physico-chemical and/or biological, means are inserted, for example the coagulator 10 and the flocculator 11 (or any other pretreatment function) significantly improves the distribution of the hydraulic supply of the solid/liquid separation system, in particular of the settling tank. This is because the transfer between the supply zone 9 or 14 and the settling tank 7 takes place without any abrupt variation in hydraulic cross section, over 100% of the width of the constructions, thus ensuring a regular and progressive spread of the hydraulic flow over all of this surface, the homogeneity of the flows moreover making it possible to optimize the utilization of the various physico-chemical treatment functions.

It is to be clearly understood that the present invention is not limited to the embodiments described above, and that it encompasses all variants thereof.

What is claimed is:

1. A modularized water treatment system comprising a plurality of petal shaped modules which are circumferentially positioned adjacent to one another to form a daisy configuration, wherein each module comprises:

means for supplying untreated water to the module;

means for pretreating the untreated water supplied to the module by performing at least one pretreatment process;

means for separating solids from liquids of the pretreated water;

the solid/liquid separation means contained within a structure of circular shape, and the untreated water supply means as well as at least one of the pretreatment means being incorporated in an isosceles trapezoidal structure having a projected projected apex that lies along an extension of a diameter of the circular structure, the sides of the isosceles trapezoidal structure being tangential to the circular structure and intersecting the projected projected apex, and the base of the trapezoidal structure being tangential to the circular structure at a point of intersection of the circular structure with the diametrical extension.

2. The system of claim 1 wherein the pretreating means incorporated in the isosceles trapezoidal structure includes means for performing both coagulation and flocculation.

3. The system of claim 1 wherein the pretreating means comprises desanding and degreasing means, both being included in the isosceles trapezoidal structure.

4. The system of claim 1 wherein the pretreating means further comprises means for biologically pretreating the untreated water that is included in the isosceles trapezoidal structure.

5. The system according to claim 1, wherein the separation means are formed by settling tanks.

6. The system according to claim 5, wherein the settling tanks are of the lamellar flow type.

7. A system according to claim 5, wherein the settling tanks have a square shape.

8. A system according to claim 5, wherein the settling tanks have a rectangular shape.

9. A system according to claim 5 wherein the settling tanks have a circular shape.

10. The system according to claim 1, wherein the separation means are formed by hydrocyclones.

11. The system according to claim 1, wherein the separation means are formed by flotation systems.

12. The system according to claim 1, wherein the separation means are formed by filtration means.

13. The system according to claim 1, wherein the area of the isosceles trapezoidal structure is varied in accordance with the contact times needed to complete coagulation and flocculation of water being pretreated in the structure.

14. A system according to claim 1 wherein the supply means is located in a central position at the center of the daisy configuration thereby servicing all the modules.

15. A system according to claim 14, wherein the central supply means further contains: means for distributing the supplied untreated water to the modules, sediment pumps, reagent metering devices, monitoring devices, and module control devices.

16. A system according to claim 14, wherein the supply means is a cylindrical tank that is supplied axially by a channel and further includes means for distributing hydraulic supply flow to each module.

17. A system according to claim 14, wherein the supply means is a cylindrical tank that is supplied tangentially by a channel and is equipped with means for distributing hydraulic supply flow to each module.

18. A system according to claim 1 wherein the modules are joined along common sides of the isosceles trapezoidal structures, the maximum number of connectable modules being 360/A, where A is the angle at the projected projected apex of the isosceles trapezoidal structure.

* * * * *